United States Patent
Brändli et al.

(10) Patent No.: US 12,316,959 B2
(45) Date of Patent: May 27, 2025

(54) ENVIRONMENTAL MODEL MAINTENANCE USING EVENT-BASED VISION SENSORS

(71) Applicant: Sony Advanced Visual Sensing AG, Schlieren (CH)

(72) Inventors: Christian Brändli, Baden (CH); James G. Lewis, Riehen (CH); Stefan Isler, Zürich (CH)

(73) Assignee: Sony Advanced Visual Sensing AG, Schlieren (CH)

( * ) Notice: Subject to any disclaimer, the term of this patent is extended or adjusted under 35 U.S.C. 154(b) by 564 days.

(21) Appl. No.: 17/421,167

(22) PCT Filed: Jan. 25, 2020

(86) PCT No.: PCT/IB2020/050588
§ 371 (c)(1),
(2) Date: Jul. 7, 2021

(87) PCT Pub. No.: WO2020/152655
PCT Pub. Date: Jul. 30, 2020

(65) Prior Publication Data
US 2022/0060622 A1    Feb. 24, 2022

Related U.S. Application Data

(60) Provisional application No. 62/796,742, filed on Jan. 25, 2019.

(51) Int. Cl.
*H04N 23/65*    (2023.01)
*G06F 1/3206*    (2019.01)
(Continued)

(52) U.S. Cl.
CPC ........... *H04N 23/65* (2023.01); *G06F 1/3206* (2013.01); *G06F 3/0346* (2013.01); *G06F 11/3058* (2013.01)

(58) Field of Classification Search
CPC ..... H04N 23/65; G06F 1/3206; G06F 3/0346; G06F 11/3058; G06F 1/1626;
(Continued)

(56) References Cited

U.S. PATENT DOCUMENTS 9,083,960 B2   7/2015   Wagner et al.
9,336,440 B2   5/2016   Ramachandran et al.
(Continued)

FOREIGN PATENT DOCUMENTS

CN    103813156 A    5/2014
CN    105865462 A    8/2016
(Continued)

OTHER PUBLICATIONS

International Search Report and Written Opinion of the International Searching Authority, mailed on Apr. 24, 2020, from International Application No. PCT/IB2020/050588, filed on Jan. 25, 2020. 18 pages.
(Continued)

*Primary Examiner* — Lee E Rodak
*Assistant Examiner* — Byung Ro Lee
(74) *Attorney, Agent, or Firm* — HoustonHogle LLP

(57) ABSTRACT

A method and system comprising one or more event-based vision sensors for monitoring an environment and one or more depth sensors monitoring the environment as well as potentially additional sensors to monitor the environment such as inertial measurement units and image sensors. The device as a processor assembly will then monitor the event-based vision sensor and the depth sensor and other sensors and determine whether to adapt a control scheme, such as activate, the depth sensor to acquire depth information of the environment based on the response of the event-based vision sensor. This approach leverages advantages of event-based sensors to reduce the power consumption but still react
(Continued)

quickly to such changes by continuously measuring intervals directly relating to the minimally admitted delays in the application for which depth measurements or inferred data are used.

22 Claims, 11 Drawing Sheets

(51) Int. Cl.
*G06F 3/0346* (2013.01)
*G06F 11/30* (2006.01)

(58) Field of Classification Search
CPC ...... G06F 1/163; G06F 1/1684; G06F 1/1686; G06F 1/1694; G06F 1/3215; G06F 1/3231; G06F 1/3287; G06F 3/017; G06F 3/0304; G06F 3/011; Y02D 10/00
USPC ........................................... 702/153
See application file for complete search history.

(56) References Cited

U.S. PATENT DOCUMENTS

| | | | |
|---|---|---|---|
| 9,552,644 | B2 | 1/2017 | Lee et al. |
| 2012/0327218 | A1 | 12/2012 | Baker et al. |
| 2014/0267631 | A1 | 9/2014 | Powers et al. |
| 2017/0084044 | A1 | 3/2017 | Keh et al. |
| 2018/0068206 | A1* | 3/2018 | Pollach .................. G06V 20/56 |
| 2018/0173232 | A1* | 6/2018 | Schwindt ............. G05D 1/0088 |
| 2018/0308253 | A1 | 10/2018 | Ryu et al. |
| 2019/0045173 | A1 | 2/2019 | Hicks |

FOREIGN PATENT DOCUMENTS

| | | |
|---|---|---|
| EP | 3 089 111 B1 | 4/2016 |
| KR | 10-2016-0072477 A | 6/2016 |
| KR | 10-2019-0134476 | 12/2019 |
| WO | WO 2014133691 A1 | 9/2014 |
| WO | WO 2014178836 A1 | 11/2014 |

OTHER PUBLICATIONS

Jelicic, J., "Power Management in Wireless Sensor Networks with High-Consuming Sensors," Qualifying Doctoral Examination, 1-9 (2011).

Leung, S., et al., "Toward a Large-Scale Multimodal Event-Based Dataset for Neuromorphic Deep Learning Applications," Micro-and Nanotechnology Sensors, Systems, and Applications X, 10639-T-1-10639-T-10 (2018).

Lobaton, E., et al., "A Distributed Topological Camera Network Representation for Tracking Applications," IEEE Transaction on Image Processing, 19(10): 2516-2529 (2010).

Zhu, A. Z., et al., "Event-Based Visual Inertial Odometry," IEEE Conference on Computer Vision and Pattern Recognition, 5816-5824 (2017).

International Preliminary Report on Patentability, mailed on Aug. 5, 2021, from International Application No. PCT/IB2020/050588, filed on Jan. 25, 2020. 11 pages.

* cited by examiner

Smart glasses / AR glasses / VR glasses

ENVIRONMENTAL MODEL MAINTENANCE USING EVENT-BASED VISION SENSORS

RELATED APPLICATIONS

This application is a § 371 National Phase Application of International Application No. PCT/IB2020/050588, filed on Jan. 25, 2020, now International Publication No. WO 2020/152655 A1, published on Jul. 30, 2020, which International Application claims the benefit under 35 USC 119 (e) of U.S. Provisional Application No. 62/796,742, filed on Jan. 25, 2019, which are incorporated herein by reference in their entirety.

BACKGROUND OF THE INVENTION

Depth sensors and machine vision and cameras (such as CMOS image sensors) are common components of many computing devices. Especially, mobile computing devices, such as smartphones and tablet devices, use one or a combination of the two sensing types for facial recognition and gesture tracking. The depth sensors are also helpful to track the environment more generally so the device can know when the user approaches or what the distance to objects is, while cameras allow an estimation of the reflectance and/or luminous emittance properties of these objects. In addition, a SLAM (Simultaneous localization and mapping) method is often used to estimate the position of the apparatus in space. The SLAM method estimates the apparatus pose (position and orientation) constantly based on inertial measurement unit (IMU), camera and other sensor readings. This is helpfully augmented with a depth map from a depth sensor.

Depth and image sensors also enable the devices to create models of their surrounding environment. Such models are helpful to augmented reality (AR) applications programs (apps) executing on the computing devices, for example. Other examples include autonomous robots navigating through and/or interacting with their environment.

SUMMARY OF THE INVENTION

Operating depth sensors can be expensive for these computing devices in a number of ways. Most depth sensors consume high levels of power. Structured light depth sensors and time of flight (ToF) depth sensors are active devices that must illuminate the environment, often in the infrared. Passive depth sensing approaches such as stereo cameras or depth inference from priors, for example using neural networks (e.g. convolutional), are computationally expensive, and thus power intensive. Additionally, operating the depth sensors is also computationally expensive. The information from the depth sensors must be interpreted and the environmental model must be recalculated based on the new depth information.

Operating conventional image sensors (cameras) is also expensive for these computing devices. While consuming lower levels of power compared to depth sensors, their power consumption is still considerable, especially when operating at high frequencies and/or resolutions. Additionally, their operation produces high amounts of data that must be stored, moved and processed, resulting in a high demand of both power and memory.

On the other hand, event-based vision sensors offer many advantages, mainly by intrinsically compressing the data stream, thus reducing the amount of data that a processing unit needs to process. They also use less power than conventional illumination sensors (cameras). Furthermore, the event-based vision sensor pixels continuously sense the visual changes in the scene at a high frequency (up to multiple kilohertz(kHz)) and report them with a very low latency. This makes the event-based vision sensor an ideal sensor for always-on tasks such as monitoring the device's environment, smart sensor control or data enhancement of secondary sensing modalities.

The present approach leverages advantages of event-based sensors to reduce the power consumption. Conventional motion sensing assemblies may typically be composed of conventional machine vision cameras which may be used to infer information from incident light and one or several inertial measurement units (IMU) which may be used to infer information about accelerations and rotational velocities as well as the bearing of the device. From the incident light, both information about the devices' own motion and about motion and changes in the devices' surroundings which may be caused by moving objects or changes in illumination may be inferred. From the IMU measurements only an inference on the devices' own motion is possible. If a device is placed in a non-static environment changes in the surroundings may not be sensed by an IMU and either the illumination will need to be measured or depth measurements must be triggered. In order to react quickly to such changes, the surroundings must be continuously measured in intervals directly relating to the minimally admitted delays in the application for which depth measurements or inferred data are used and still delays may not be avoided. Such requirements and delays may make it impossible to reach the optimal control scheme for the involved sensors, e.g. minimal number of depth measurements theoretically necessary for any given application, which would result in the lowest power consumption. Image captures, which are unnecessary, will increase power demand and limit the achievable gain in power demand further. Adding an event-based sensing cycle solves these issues. Conventional illumination sensors (cameras) need more power than event-based sensors and have a much lower sampling frequency (typically a few tens of Hz compared to multiple kHz). Illumination measurement (image) captures take longer and are more delayed compared to measurements with an event-based sensor. Including event-based sensors enables the detection of changes in the environment very quickly and hence allows depth measurement trigger times derivation, areas or other control parameters much closer to the theoretical optimum while needing less power than conventional motion sensing assemblies. Additionally, the high temporal resolution of event-based vision sensors allows a more accurate estimation of the dynamic state of objects and hence a more accurate prediction of their state at future points in time.

Generally, the event-based sensing cycle may involve analyzing the stream of incoming measured illumination changes (events) in the frustum of the event-based sensors for events corresponding to unexpected and or unpredicted changes. In the case where this search is successful, i.e. changes in the environment have been identified based on the analyzed events, the algorithm may adapt the control scheme for components such as the depth sensing assembly or CMOS cameras accordingly. The adapted control may include properties beyond trigger times and area such as how the projected light is modulated for a projection based depth sensor or exposure times and gain for a CMOS camera. All components may be triggered asynchronously as their control scheme is continuously adapted over time to optimize objectives such as power and other measures, an example being the accuracy of state variables estimated by algorithms processing the acquired sensor data.

In general, according to one aspect, the invention features a method for maintaining an environmental model. The method comprises monitoring an environment with one or more event-based vision sensors and based on the monitoring by the event-based vision sensor, determining whether to adapt a control scheme of (e.g., activate) a depth sensor or other sensing modalities (e.g., camera) to acquire more information from the environment. Then, the environmental model may be updated based on the gathered sensor readings.

In embodiments, the method further includes acquiring motion information from an inertial measurement unit and/or camera and based on the motion information, together with the measured events, determining whether to activate the depth sensor to acquire depth information of the environment.

Also in embodiments, events and, potentially, IMU data are used to infer whether the environmental model must be updated, which is decided based on whether or not additional data must be acquired to carry out such an update. The additional data may include measurements from the depth sensing assembly, cameras or other sensors which are not operated in an always-on manner.

Further, the method might also include only updating the environmental model if the events detected by the event-based vision sensor do not sufficiently match events predicted using the environmental model. Updates to the environmental model may always be based on any combination of sensor measurements and the update decision is typically combined with a decision as to which additional measurements must be taken, e.g. depth sensor readings.

The method may further combine the acquired motion information from inertial measurement units with measurements from conventional illumination sensors (cameras) and/or the depth sensors and/or event-based sensors to calculate the pose (coordinates and orientation) of the device along with other estimates such as translational velocities. Estimates may be calculated using a state of the art implementation of a class of algorithms known as simultaneous localization and mapping (SLAM).

In embodiments, the estimated pose of the device is used together with the environmental model to predict expected measurements by the event-based sensors which are then used to decide whether the control scheme for non-always on sensors should be adapted.

In general, according to another aspect, the invention features a computing device. This device comprises one or more event-based vision sensors for monitoring an environment, a camera for producing image data of the environment, and a depth sensor assembly for monitoring the environment. A processor assembly of the device monitors the event-based vision sensor, camera, and the depth sensor assembly. The processor assembly determines whether to adapt a control scheme of the depth sensor assembly to acquire depth information and/or the camera to acquire image information of the environment based on the response of the event-based vision sensor.

In one example, adapting a control scheme of the camera and/or depth sensor includes simply activating the depth sensor assembly and/or the camera. Other specific examples include triggering single or a few measurements by the depth sensing assembly and/or the camera. In another example, the control scheme is adapted by adjusting more parameters depending on the capabilities of the respective sensors. Examples include how the light of projector of the depth sensing assembly is modulated and/or the area at which its light is targeted and/or exposure time and gain for the camera's acquisition of the image data.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
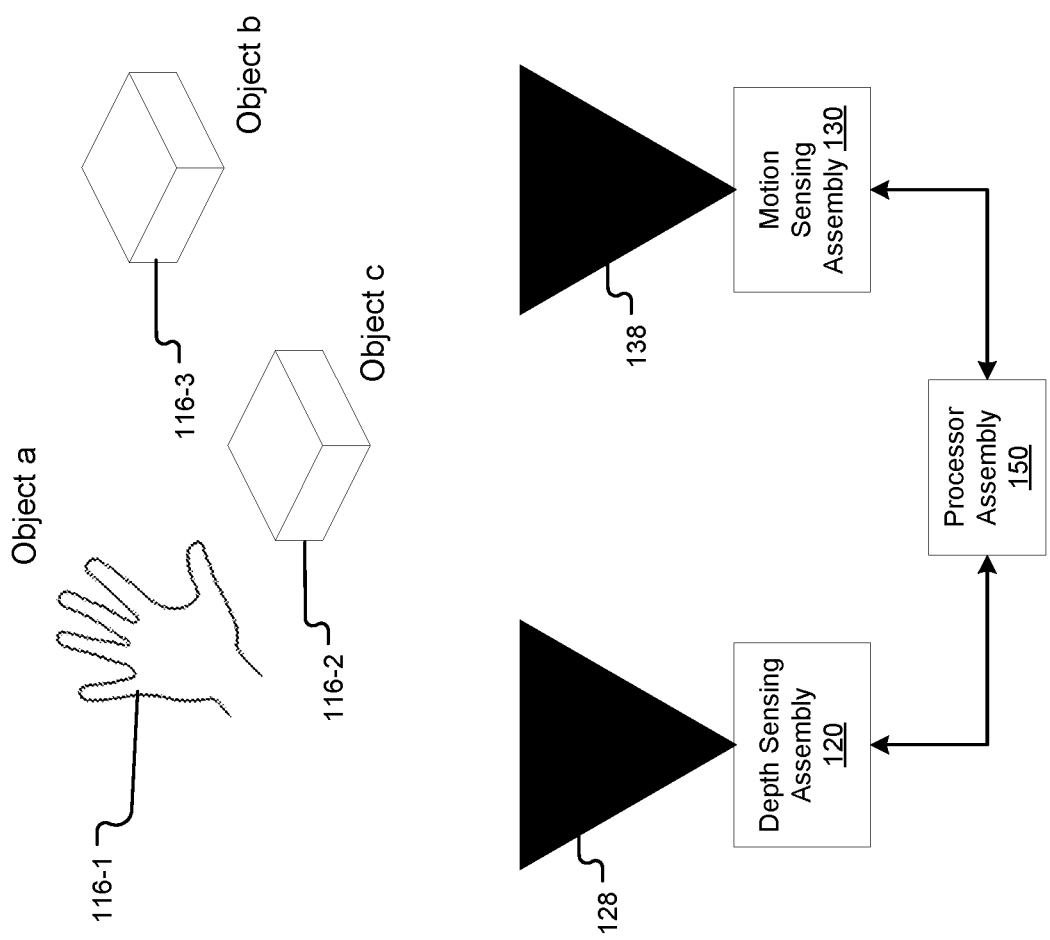
FIG. 1 is a schematic view showing a user computing device monitoring and tracking an environment with a depth sensing assembly and a motion sensing assembly.

FIG. 1 depicts a typical scenario in which a user device 10 monitors an environment containing objects such as a user's hand and other things. The user device might be a mobile computing device such as a smartphone or tablet computing device. Other devices include televisions, internet of things (IOT) devices, augmented reality (AR) or virtual reality (VR) devices, light field displays, holographic displays, stereoscopic displays (two rendering points), and automobile heads-up display systems to list a few examples.

As is common, the user computing device 10 has depth sensing assembly 120 and a motion sensing assembly 130. The depth sensing assembly 120 and the motion sensing assembly 130 have corresponding fields of view 128, 138. These fields of view 128, 138 are characterized by the fields of view of the various sensors and emitters that are included in each of these sensor assemblies 120, 130. In many cases, the individual sensors of these assemblies may have respective wider or narrower fields of view. However, for the purposes of the following description, the fields of view are treated collectively and generally coextensive with each other.

The user device 10 in the typical example executes one or more applications or apps. These executing apps utilize information from the depth sensing assembly 120 and the motion sensing assembly 130 to create and may update an environmental model. This model contains information concerning the environment of the device 10 such as detected objects 116-1, 116-2, 116-3 within the device's field of view 128, 138 and the detected motion of those objects.

A processor assembly 150 may execute an AI app, which can sometimes be used to infer depth based on trained priors, whereby the algorithm may run on a dedicated application processor, multiple central processing units, memory, visual processing units, graphics processing units, artificial intelligence processing units or other dedicated components.

Figure 2:
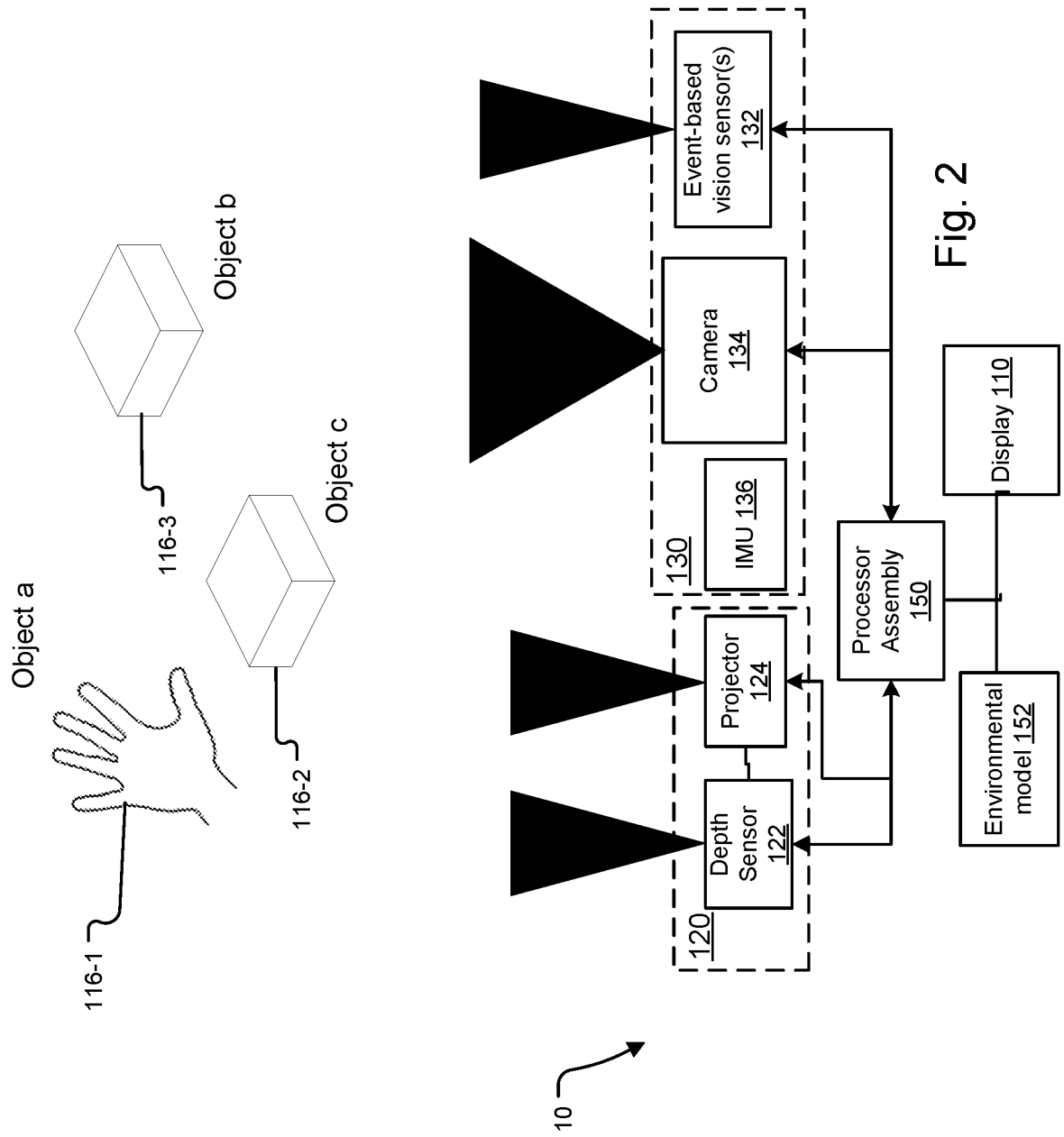
FIG. 2 is a schematic view showing more details of the computing device and the depth sensing assembly and motion sensing assembly.

FIG. 2 shows additional details of the user device 10. In the illustrated example, the depth sensing assembly 120 comprises a depth image sensor 122 and a dot projector 124. This is one depth sensor implementation that is often referred to as a structured light depth sensor. In such devices, the projector 124 projects a known light pattern onto the scene and specifically the objects within the scene, and the depth image sensor 122 is an infrared image sensor that detects the scene and the projected infrared pattern and uses that information to process and thus then resolve the depths of the various objects within the scene.

There are other examples of depth sensing technology. For example, time of flight (ToF) sensors illuminate the scene and the objects within the scene with a modulated infrared light source. The ToF sensor is a fast image sensor that resolves the time of flight of the light to and from the objects within the scene. Still other examples of the depth sensor involve stereo image sensors that use the binocular effect to resolve the distance of objects in the scene.

The exemplary motion sensing assembly 130 has separate sensors. Specifically, the illustrated example has an inertial measurement unit (IMU) 136, a camera such as a CMOS image sensor 134, and one or more event-based vision sensors 132.

The IMU 136 often includes a magnetometer, accelerometer, and gyroscope. These are used to determine the pose of the user device 10 by determining its orientation within the earth's gravitational field and magnetic field along with rotational and translational movement.

The depth sensing assembly 120 and the motion sensing assembly 130 are controlled by a processor assembly 150. In the illustrated example, this processor assembly 150 might drive a display 110, such as a touchscreen display. Also, the processor assembly has typically one or more apps executing on the processor assembly 150 to maintain and update an environmental model 152 by tracking the objects in the device's surrounding environment.

The processor assembly 150 includes a central processing unit and possibly a graphic processing unit and possibly other dedicated processing units such as a neural network processor. In addition, the processor assembly may include random access memory along with program memory, which contains one or more apps that execute on the processor assembly.

Figure 3:
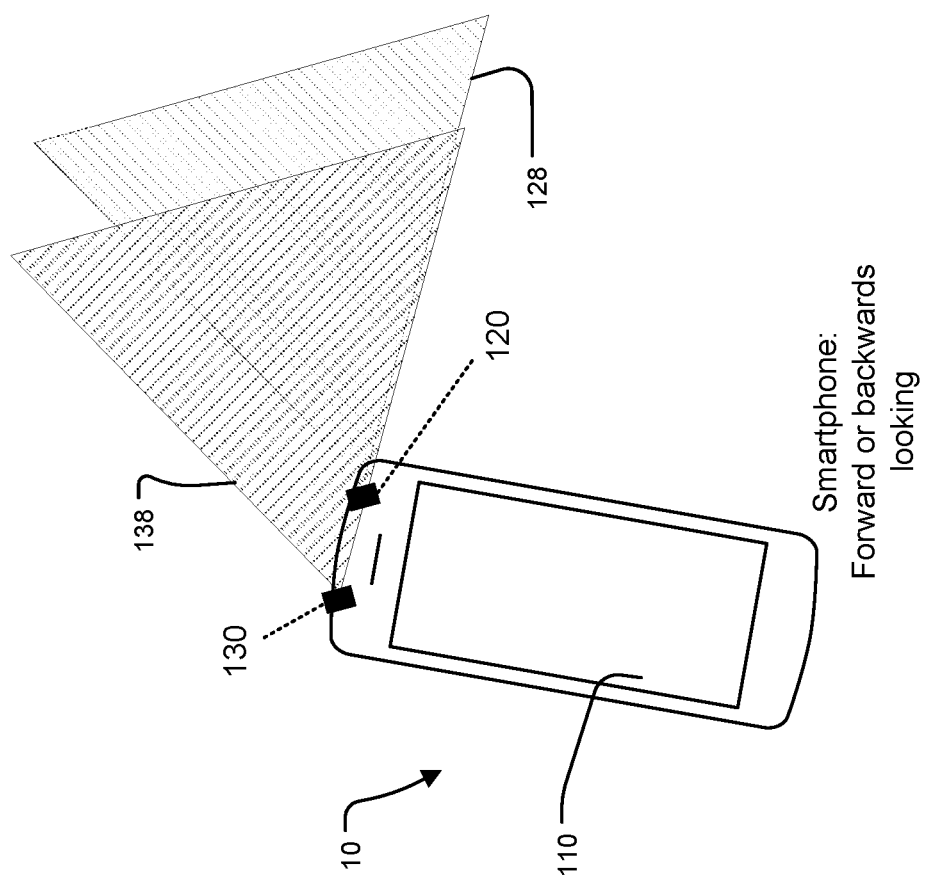
FIG. 3 is a schematic view showing a mobile computing device (smartphone) with the depth sensing assembly and motion sensing assembly.

As shown in FIG. 3, in some examples, the user device 10 is a mobile computing device. In the illustrated example, the smartphone user device includes a touchscreen display 110. The depth sensor assembly 120 and the motion sensor assembly 130 are either rear-facing or front-facing or both front and rear-facing. As a result, the user device 10, by controlling these assemblies, can maintain an environmental model covering both the region in front of the device and the region in the rear of the device.

Figure 4:
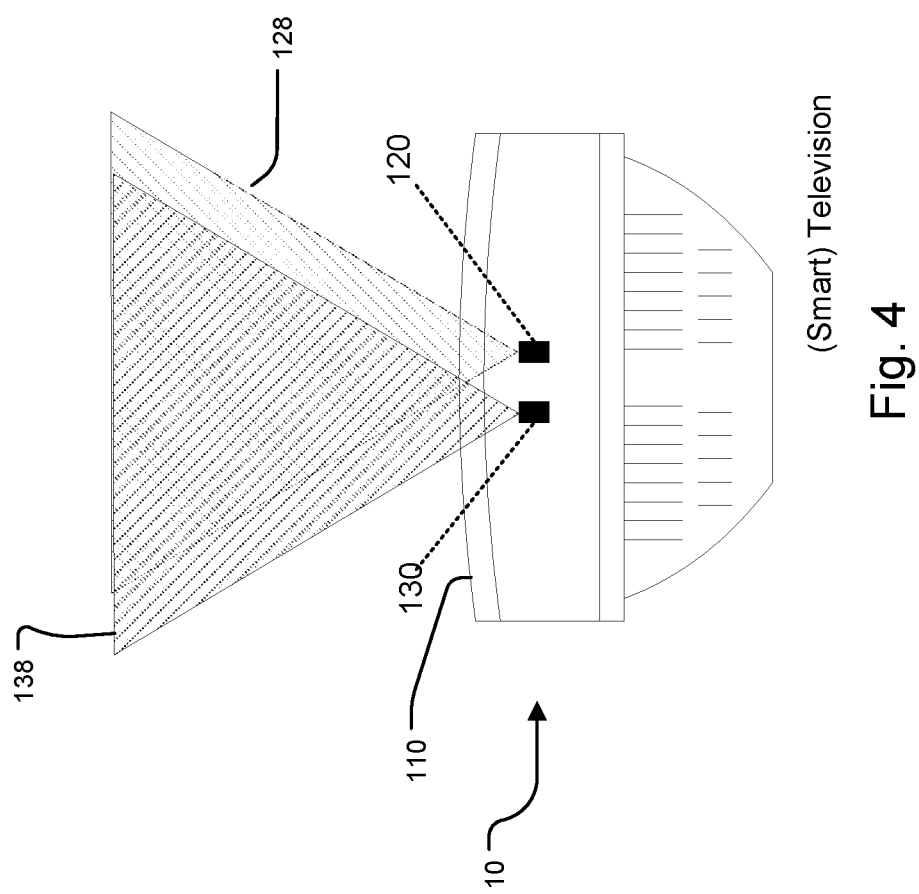
FIG. 4 is a schematic view showing a television computing device with the depth sensing assembly and motion sensing assembly.

As shown in FIG. 4, in other examples the user device 10 is a smart television. Here the depth sensor assembly 120 and the motion sensing assembly 130 track objects in the environment in front of the smart television 10 in order to recognize the presence of viewers and also possibly resolve gestures by those viewers to control the smart television.

Figure 5:
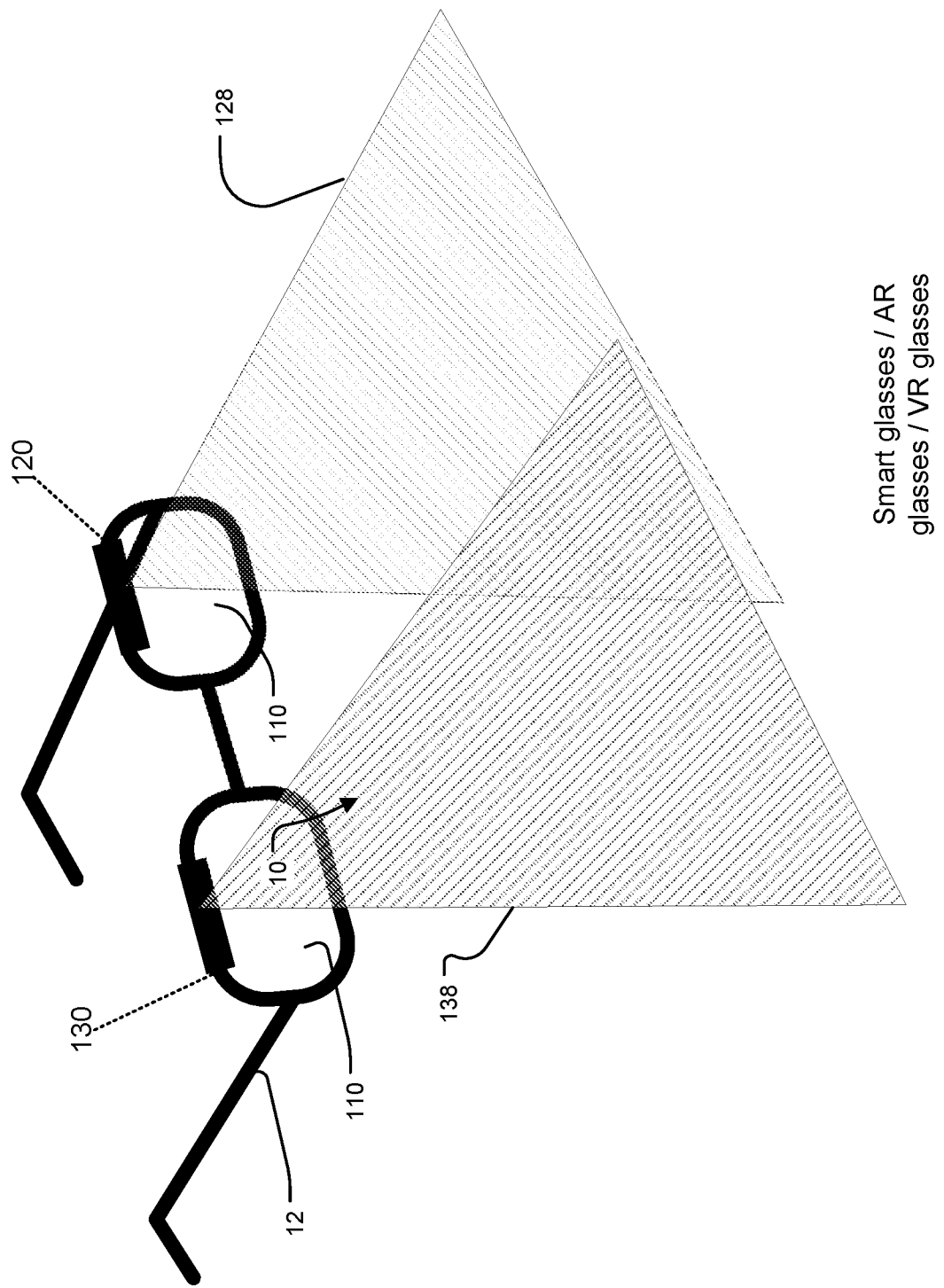
FIG. 5 is a schematic view showing a AR/VR head-mounted computing device with the depth sensing assembly and motion sensing assembly.

FIG. 5 shows still another example of the user device. Here, the user device is an AR/VR heads-up display, such as glasses. This is typically mounted to the user's head. Two displays 110 are positioned by a frame in the regions in front of the user's eyes and may be transmissive for an augmented reality (AR) display device. Here again, the depth sensing assembly 120 and the motion sensing assembly 130 are located above the transparent displays 110 on the devices frame 12 to detect objects in front of the user.

Figure 6:
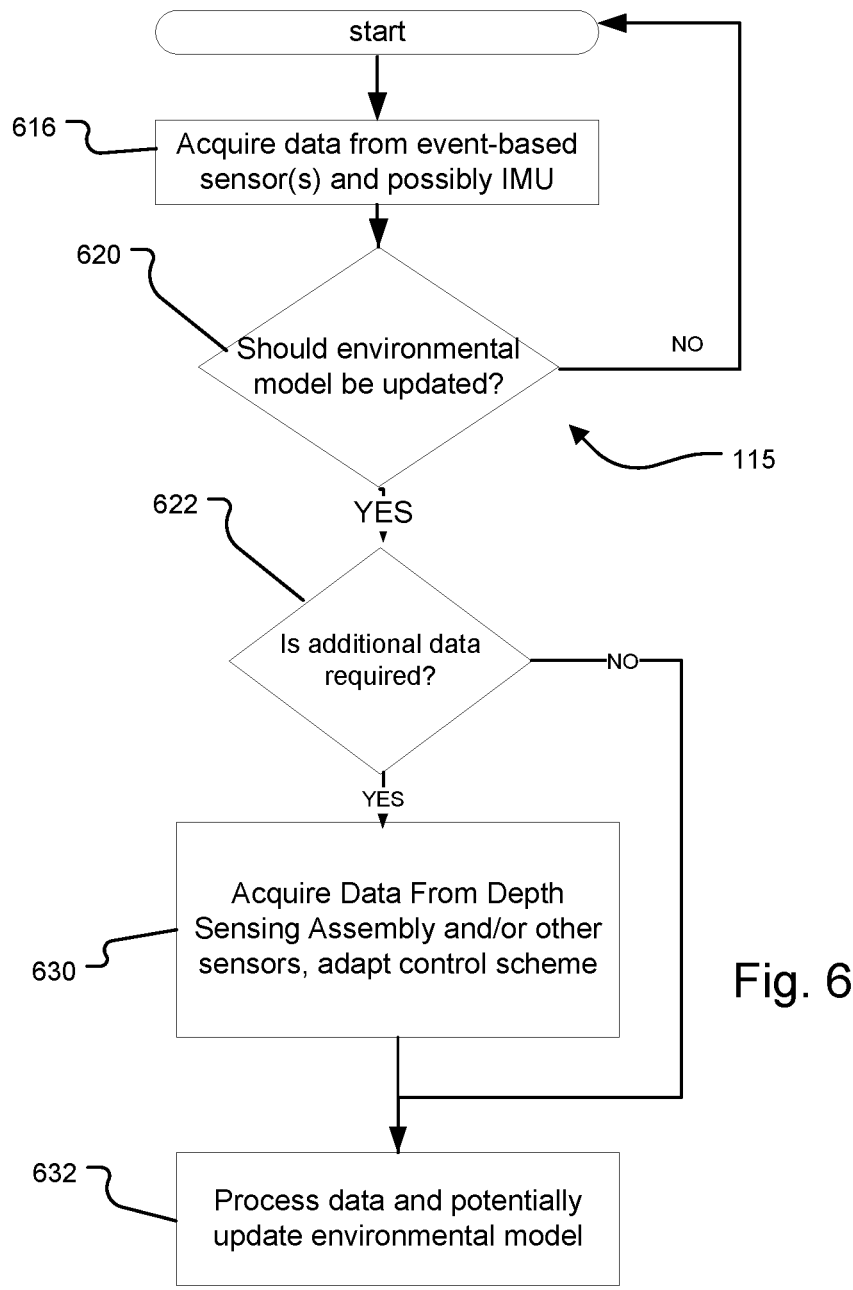
FIG. 6 is a flow diagram showing the operation of the computing device and its use of information from the event-based vision sensor to infer whether an update of an environmental model must be carried out, and if so using which modality and with which control scheme.

FIG. 6 is a flow diagram illustrating the operation of the app 115 that executes on the processor assembly 150 to maintain the environmental model 152 and/or to control when and how to gather data from the depth sensing assembly 120 or the camera 134.

The general objective is reducing the power consumed by the device while retaining the quality of the system outputs, e.g. the pose and environmental model, used by user applications such as an augmented reality application. This may, for example, be achieved by reducing the number of measurements triggered in the area measured by the depth sensing assembly or by acquiring fewer images from cameras. Depth sensing assemblies are typically very power demanding and may, as an example, thus reduce the battery life of mobile devices. Further, the area measured by the depth assembly may be reduced and other parameters may be controlled in order to optimize the power needed per depth measurement or more generally to keep the quality of system outputs above defined system specifications. The sensor measurements may be used to infer additional information, examples including computing the trajectory and motion state of the device, an environmental map of the surroundings or a segmentation and analysis of the type and state of surrounding objects. This additional information together with knowledge about the sensing components may be analyzed and used to infer and predict if, when and where it is necessary to collect a new measurement from the depth sensing assembly.

Specifically, in step 616, the processor assembly 150 acquires motion information from the motion sensor assembly 130. This information includes data from the event-based vision sensor 132 as well as potentially from an IMU 136 and possibly also the camera 134. This data is used to monitor and analyze the movement of the device 10 with respect to the environment or movement of objects 116 in that environment with respect to the device 10. For example, in one case, the processor assembly 150 analyzes the image data from an image sensor of the camera and based on how that image data changes between successive frames determines motion information for the device. In another case, the processor assembly 150 combines data from the camera 134 with the event-based data from the event-based vision sensor to determine motion information for the device.

In step 620, the app 115 executing on the processor assembly 150 analyzes the acquired data, based on and by comparing it to an environmental model 152. It is determined whether the environmental model 152 should be updated.

If it is determined in step 620 that the environmental model does not require an update, then the flow repeats itself. The advantage is that processing information from the motion sensor assembly and especially the event-based vision sensors are relatively low power processes. As a result, the device 10 is able to maintain its environmental model 152 without excessive power usage.

Similarly, if sufficient, updates to the environmental model 152 may be carried out using only data from the event-based vision sensors and IMU in order to save the power of acquiring expensive depth and image data and hence, as an example, increase battery lifetime of the device 10.

In the other case, if the environmental model 152 requires updating as determined in step 620 and additional data is needed as determined in step 622, only then is the control scheme of the depth sensing assembly 120 and/or camera sensors 134 adapted by the processor assembly 150 to acquire depth information and image data for the environment, for example, within the field of view, in step 630.

The control scheme can be adapted in a number of ways. In one example, the control scheme is adapted to only entail triggering single or a few measurements by the depth sensing assembly 120 and/or camera sensors 134. In another example, the control scheme is adapted by adjusting more parameters depending on the capabilities of the respective sensors. Examples include how the light of the projector 124 of the depth sensing assembly 120 is modulated and/or the area at which its light is targeted and/or exposure time and gain for the camera's acquisition of the image data.

Information from the depth sensing assembly 120 and the camera sensors 134 is then used to process and update the environmental map in step 632.

In general, the environmental model 152 may be represented as, not excluding other solutions, one or multiple meshes, kinematic or dynamic models, skeletons, point clouds, volumetric grids, surfels, a depth map relative to some coordinate frame fixed with device 10, transformations between multiple coordinate frames connected with object representations or a collection of assumptions about the environment against which measurements may be tested, etc. Different model types may be combined. The model may be used to infer when and where new measurements must be received from the depth sensing assembly 120 and the camera sensors 134, as well as to optimize other parameters for minimal power demand. The reason to trigger one or several new such measurements may be that there is a need to extend the model, refine the model, update the model or check if the model still matches the measurements, i.e. the surroundings of the device.

In one example, the analysis carried out in steps 620 and 622 involves an environmental model 152 in which every object in the surroundings of device 10 is modeled using a representation of its geometry, e.g. a mesh, surface properties, e.g. using textures or other look-up tables, and its kinematic state including estimates for position, orientation, velocities and accelerations. Captured events from event-based sensors 132 are determined to be associated to motion of device 10, motion of objects 116 or a modulation of light sources or a combination thereof. The association is resolved using a joint optimization or other method, possibly involving an inference on the motion and modulation of involved objects and light sources, e.g. using contrast as objective function as found in corresponding state of the art methods, or simpler methods such as a nearest neighbor search, potentially probabilistic. If not yet carried out during association, each event may be used to update the state of the objects it has been associated with.

In one example, the error of some objective function, such as the distance of an event in a space representing spatio-temporal change to the current state of the environmental model 152 is used to decide as to whether the environmental model should be updated in step 620.

In another example, a two dimensional projection of the environmental model 152 is used to compare the location and time of events detected by the event-based vision sensors 132 to the currently estimated position of objects and use this distance to decide whether or not the environmental model 152 should be updated in step 620.

Two advantages of event-based vision sensors 132 are their high temporal resolution and low data rate. This allows for fast and inexpensive updates of the environmental model 152. Estimated values which are part of the environmental model 152 may be more accurate as a conclusion of the high temporal resolution, especially in very dynamic environments or motion scenarios. This also allows for more accurate prediction-based control schemes to be used in steps 620 and 622.

In one example, not only are the depth sensing assembly 120 and cameras 134 triggered, that is, it is decided when they should gather measurements, but also other control parameters are adjusted. The projector of the depth sensing assembly 120 may be controlled to illuminate a particular area based on event activity or the modulation of light may be controlled. For cameras 134 the exposure time might be adjusted accordingly to the event-based estimate of relative speed between objects 116 and device 10.

Figure 7:
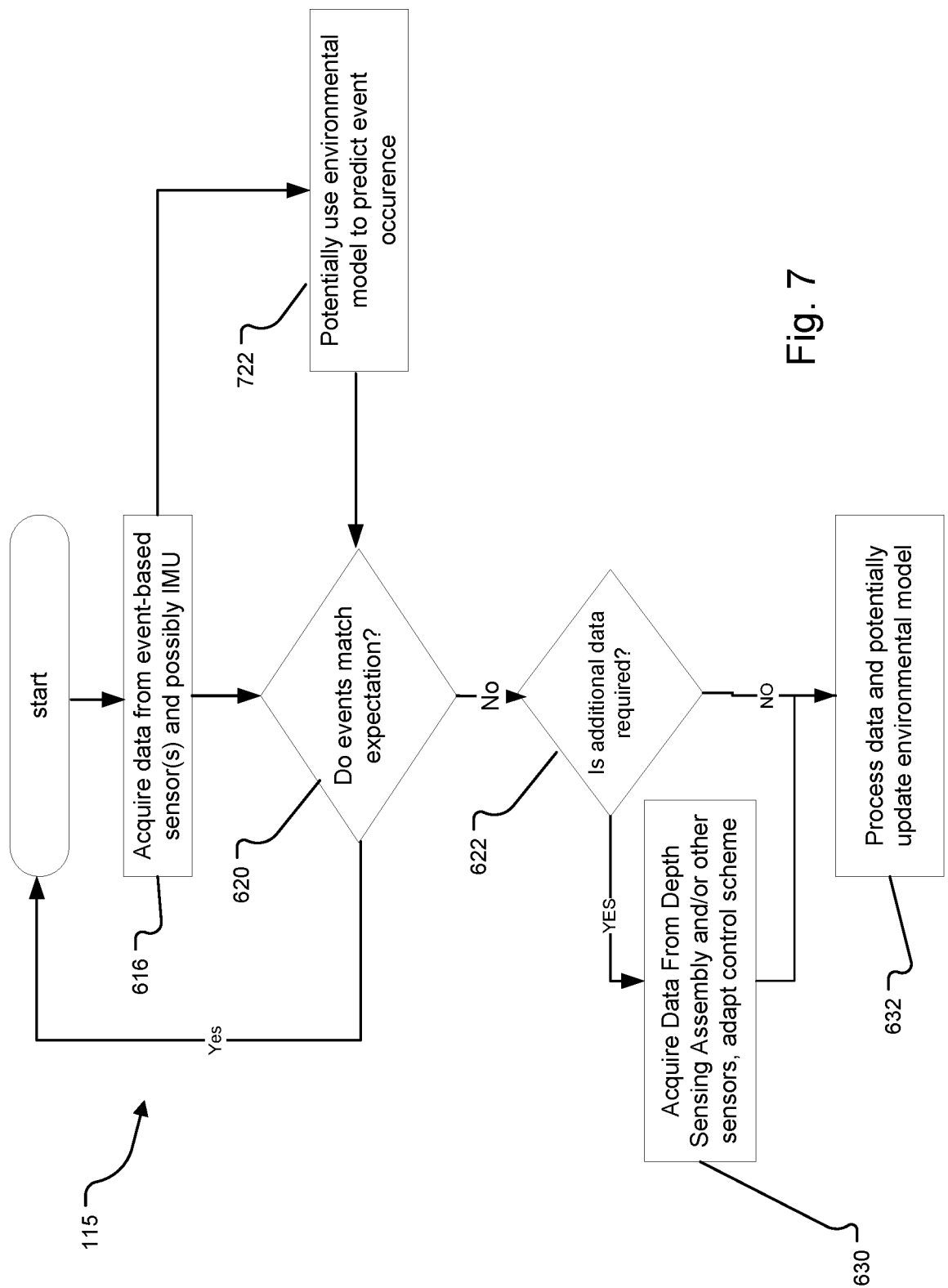
FIG. 7 is a flow diagram showing the operation of the computing device and its use of information from the event-based vision sensor to adjust the control scheme to acquire data from the non-always-on sensors such as the depth sensing assembly.

FIG. 7 is a flow diagram illustrating the operation of the app 115 that executes on the processor assembly 150 to maintain the environmental model 152 or to control when and how to gather data from the depth sensing assembly 120 or the camera 134 according to another embodiment.

This example has many steps similar to the previous example and such steps are commonly numbered.

In this example, the processor assembly 150 uses an environmental model to predict event occurrences in Step 722. It then assesses whether or not those predicted events match the measured events in step 720.

In an example where the objective is to find a control scheme for depth sensing assembly 120 or the camera 134 and not to maintain an environmental model 152, the environmental model 152 may be a fixed set of assumptions. One assumption may be that the device 10 is not moving and all measured events are either caused by moving objects 116 or modulated light sources. Modulated light sources may be filtered out in an additional step. The prediction may be based on an expected number of events, for example based on expected noise. Then, step 620 would only consist of comparing the number of measured events against the number of predicted events.

In another example, the environmental model 152 includes assumptions regarding the relative distance and appearance of non-moving objects 116 to the device 10 as well as estimates on typical velocities of device 10. Their appearance may be estimated using measurements from cameras 134. Using the rotational velocities measured by the IMU 136 and the estimated appearance, e.g. textures of the environment, measured by camera 134, step 722 estimates the number of events caused by rotational motion of device 10 only and through a subtraction from the number of measured events in step 616 obtain an estimate of the number of events caused by translational motion of device 10 or by motion of objects 116 in step 620. This number is then compared against expected number of events by translation of device 10 only, derived from environmental model 152 assumptions. In other examples assumptions are replaced by full three-dimensional models, values are coestimated and presented methods may be carried out per different areas of the event-based sensors' 132 field of view.

Generally, if there is a sufficiently large mismatch between received and predicted measurements, the app 115 may change the depth sensing assembly control scheme accordingly. Such a change to the depth sensing assembly control scheme may involve triggering more or fewer measurements, an adaption of the area which is measured or a change of other depth sensing assembly parameters such as the intensity of projections or more generally, how the illumination intensity is being modulated. It may also change the control scheme of cameras 134.

Other than that, processing is similar to the previous example. Specifically, if events match the expectation in step 620 or it is determined that no additional data is required to update the environmental model 152 in step 622, then the process repeats without activating the depth sensing assembly 120.

Figure 8:
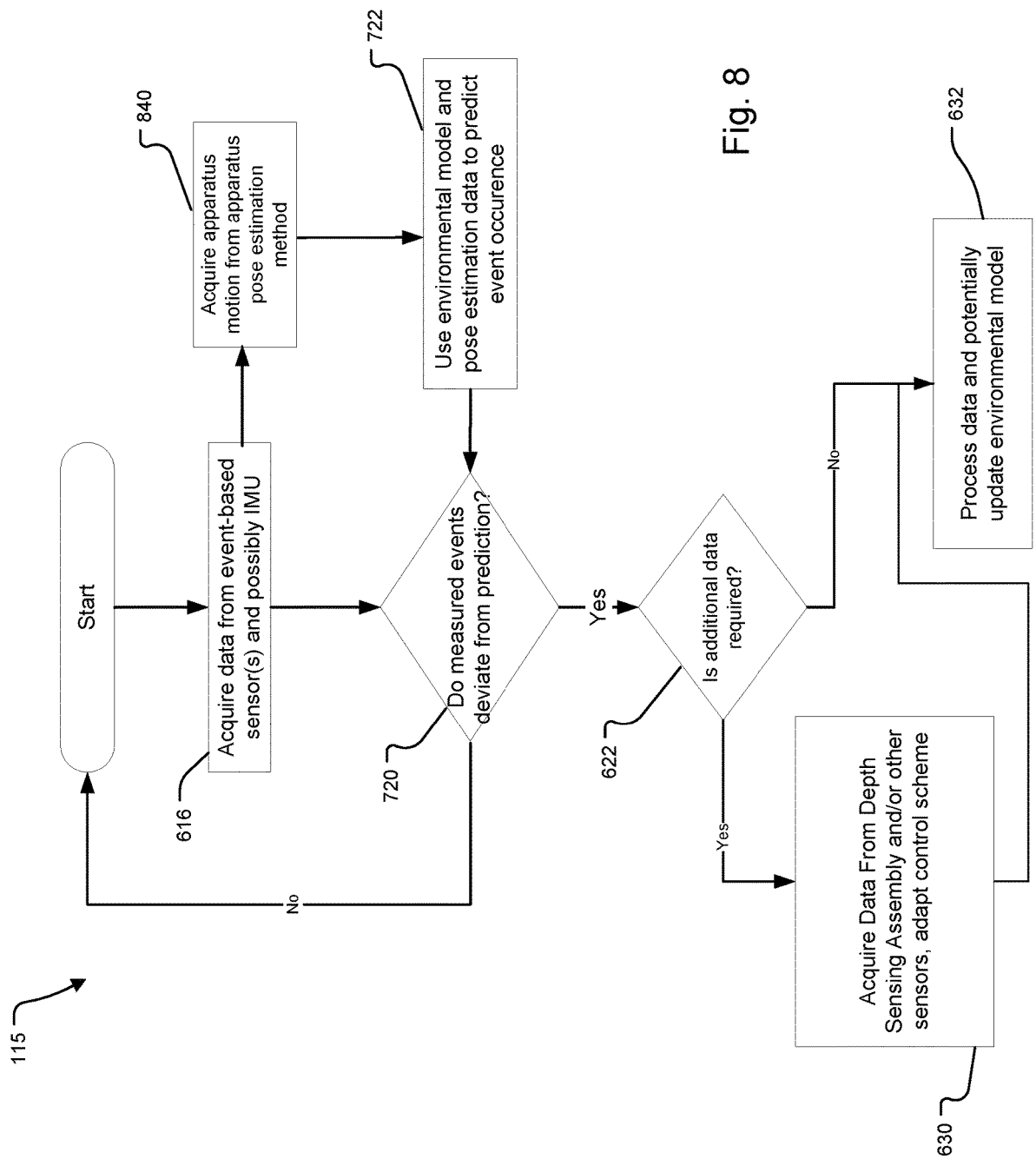
FIG. 8 is a flow diagram showing the operation of the computing device and its use of information from the event-based vision sensor to adjust the control scheme to acquire data from the non-always-on sensors such as the depth sensing assembly according to another embodiment.

FIG. 8 is a flow diagram illustrating the operation of the app 115 that executes on the processor assembly 150 to maintain the environmental model 152 or to control when and how to gather data from the depth sensing assembly 120 or the camera 134 according to another embodiment.

This example again shares steps similar to the previous examples and such steps are commonly numbered.

In this embodiment the apparatus 10 includes a pose estimation method 840 that provides a position and orientation for the device 10 at any given point in time. The pose estimation method may run in parallel to the process described in FIG. 8. Combining the changing pose together with an environmental model, e.g. textured mesh, allows to predict the occurrence of events. Using the pose it may be determined which events are caused by the devices own motion and hence a separation from events caused by dynamic objects 116 in the event-based sensors' 132 field of view(s) may be carried out. By carrying out a (possibly implicit) inference from those events on the motion of objects 116, they are used to decide whether the motion of objects 116 necessitates acquiring data from additional sources such as the depth sensing assembly 120 in steps 720 and 622 and whether control schemes must be adjusted in step 630.

In one embodiment, the environment and an analysis of present illumination sources and the environment's reflectance properties, for example as constituted by its structure and surface textures, along with the pose obtained from the pose estimation method in step 840, may be used to predict the number of events and mismatch may be represented by the difference between the number of predicted and the number of measured events after correcting for noise. In other cases, the number of events may be predicted per pixel or a set of pixels of the event based sensor and mismatch may be evaluated per pixel or set of pixels respectively. Accordingly in such an embodiment a depth assembly control scheme may be adapted depending on the (or per) direction of view of different parts of the projection and sensing parts of the depth sensing assembly and its components in step 630.

Figure 9:
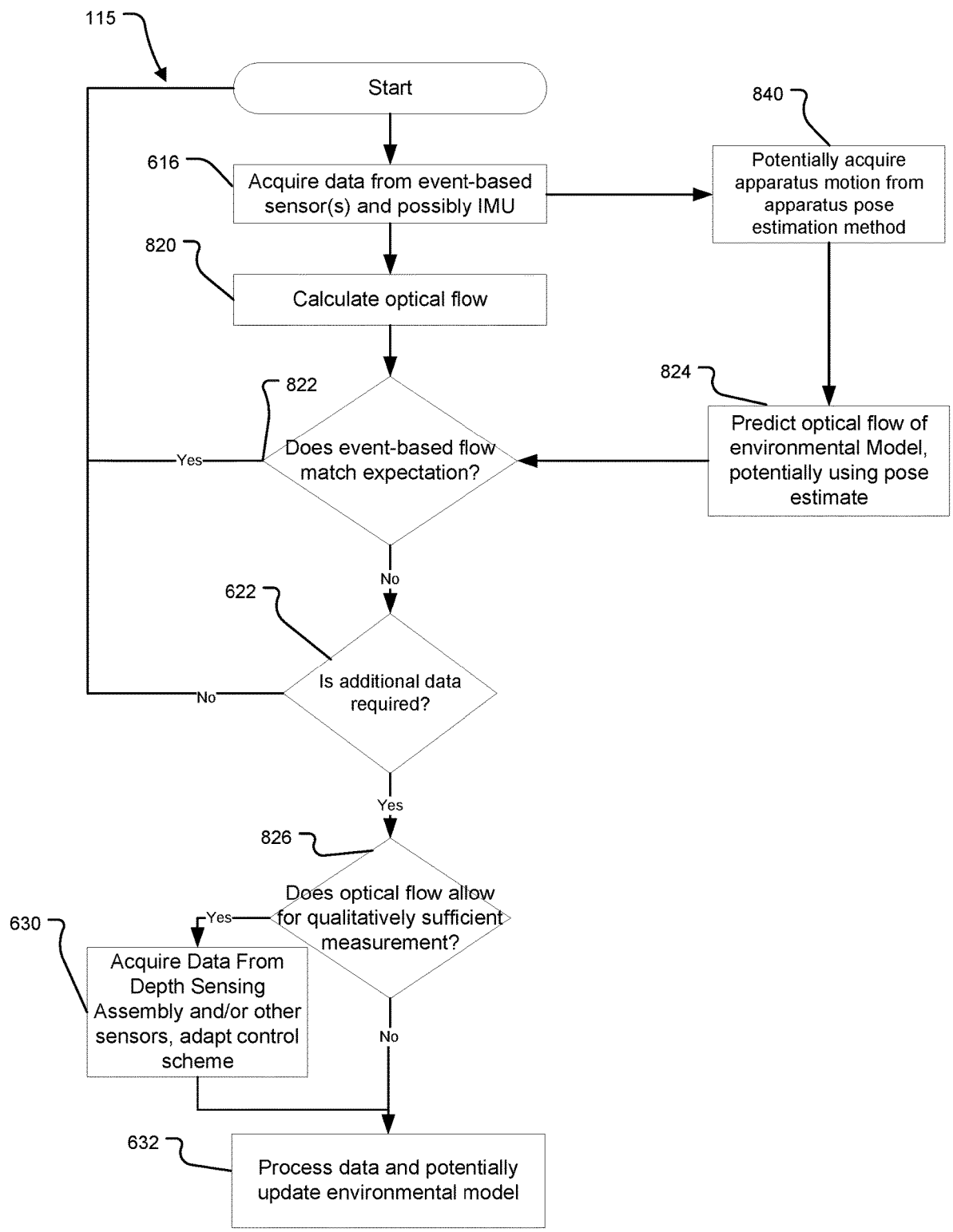
FIG. 9 is a flow diagram showing the operation of the computing device and its use of information from the event-based vision sensor to adjust the control scheme to acquire data from the non-always-on sensors such as the depth sensing assembly according to another embodiment.

FIG. 9 is a flow diagram illustrating the operation of the app 115 that executes on the processor assembly 150 to maintain the environmental model 152 or to control when and how to gather data from the depth sensing assembly 120 or the camera 134 according to another embodiment. This example again shares steps similar to the previous examples and such steps are commonly numbered.

This embodiment uses the information from the event-based sensors 132 acquired in step 616 to calculate an optical flow in step 820. A predicted optical flow is determined in step 824. Then in step 822, it is determined whether or not measured optical flow matches what was predicted. If there is a match to the predicted flow, then the depth sensing assembly 120 may not be activated. Optical flow is one example for an intermediate measurement representation computed from events, which is then used to infer through an error analysis (mismatch) whether the depth sensing assembly 120 is to be activated or not. Other possible intermediate representations may include a search for and analysis of geometric shapes present in the data and their positions, event-based trackers whose position is updated with every event measured in their vicinity or others. The general principle is that an expectation is formulated for the intermediate representation as in step 824, a measurement based intermediate representation is calculated as in step 820 and measurement and prediction based representations are compared as in step 822.

If the optical flow indicates an unexpected change in the environment, that is the event-based flow does not match the expectation, the depth sensing assembly may be activated and the control scheme may be adjusted in step 630. This same decision holds for cameras 134.

In this embodiment the optical flow is also used to inhibit depth sensing assembly or camera triggers as executed in step 822, and to determine whether additional data is required in step 622. Optical flow represents information about how fast objects in the environment move relative to the device 10 as perceived by the device's sensors. The measurements of many sensors including depth sensors and conventional illumination sensors (cameras) are affected by this relative velocity, an effect known to those skilled in the art as motion blur. The quality of measurements will typically decrease as the relative velocity increases. The measured optical flow can hence be used to block a depth sensing assembly or camera trigger in step 826 if the quality of the measurement is expected to be insufficient. Any intermediate representation which allows an inference on relative velocity can be used to operate such an inhibitor block 826.

Here, the app 115 does not directly predict and analyze the illumination changes measured by the event-based sensors but compute intermediate data representations. It calculates optical flow based on the measured illumination changes or optical flow based both on the measured illumination changes and a model of the world. In both cases the environmental model of the world together with an estimation of the device's own motion may be used to predict expected optical flow. Predicted optical flow and measured optical flow may be used to adapt the depth sensing assembly control scheme, e.g. by triggering a new measurement.

Figure 10:
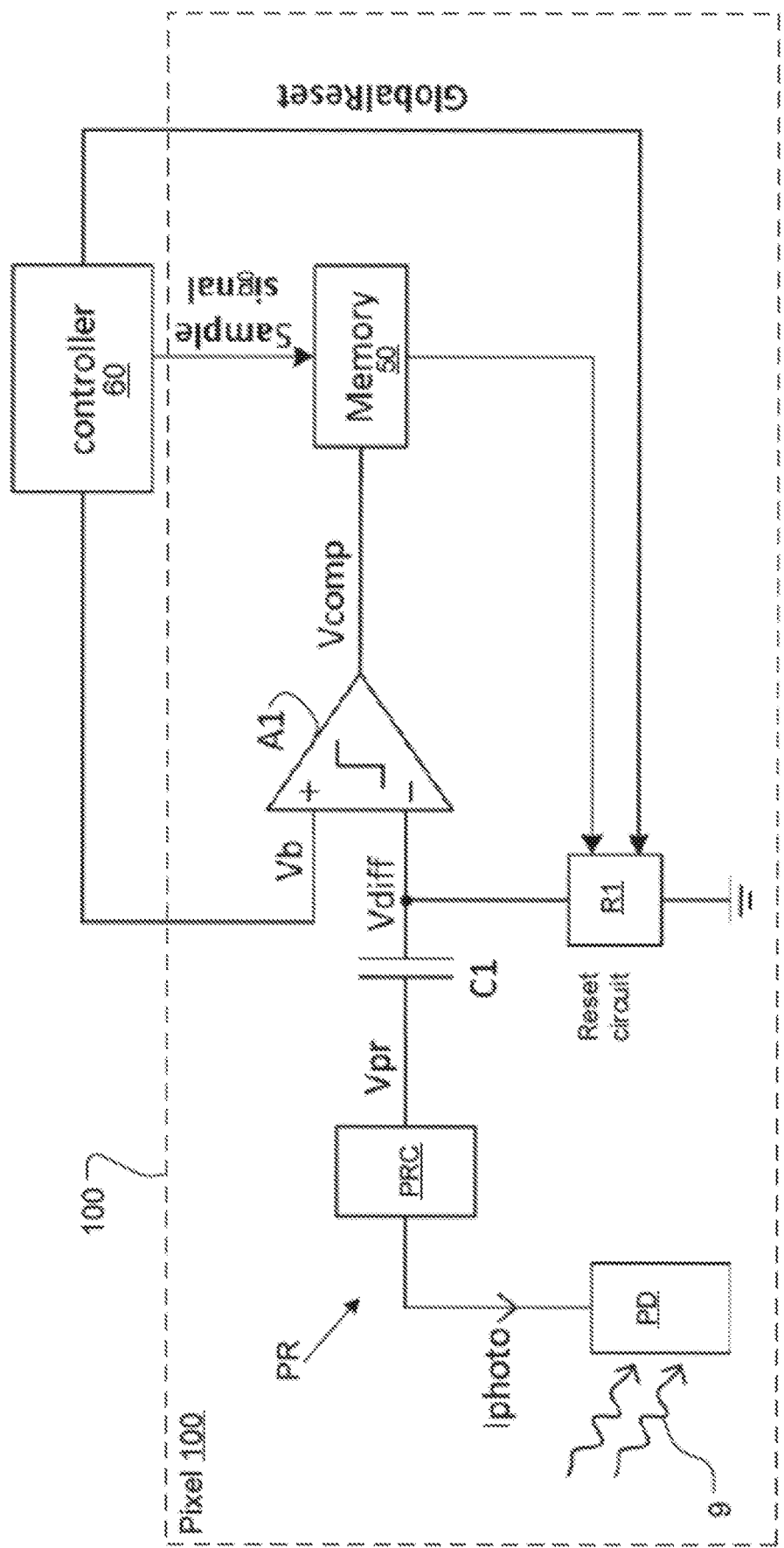
FIG. 10 is a circuit diagram showing the components and connections of a pixel circuit for an event-based vision sensor.

For background, FIG. 10 shows components of one possible pixel circuit, for the event-based vision sensor 132.

The major components of a pixel circuit 100 are enumerated below.

1. Photoreceptor module. As shown in the figure, the pixel circuit contains a photodiode PD, or other photosensor, to measure impinging light 9 and convert the light intensity to current Iphoto; a photoreceptor circuit PRC to generate a photoreceptor signal Vpr dependent on the light intensity; and a memory capacitor C1 to remember past photoreceptor signal. The photosensor PD and photoreceptor circuit PRC constitute the photoreceptor module PR.

2. Memory capacitor C1: Receives the photoreceptor signal Vpr such that the first plate of the capacitor carries a charge that is responsive to the photoreceptor signal Vpr and thus the light received by the photosensor PD. A second plate of the memory capacitor C1 is connected to the comparator node (inverting input) of A1. Thus the voltage of the comparator node, Vdiff, varies with changes in the photoreceptor signal Vpr.

3. Comparator A1: This is a means to compare the difference between current photoreceptor signal Vpr and past photoreceptor signal to a threshold. This comparator A1 can be in each pixel, or shared between a subset (for example a column) of pixels. In the preferred embodiment the comparator will be integral to the pixel, with each pixel having a dedicated comparator A1.

4. Memory: Memory 50 stores the comparator output based on a sample signal from the controller 60. Memory can be a sampling circuit (for example a switch and a parasitic or explicit capacitor) or a digital memory circuit (a latch or a flip-flop). In one embodiment, the memory will be a sampling circuit and each pixel will have two memories.

5. A conditional reset circuit R1: Condition for reset is a combination of the state of the memorized comparator output and a reset signal applied by a controller.

6. Peripheral circuit components: The comparator A1 and the memory 50 can be located in the pixel or in peripheral circuits (outside the pixel circuit).

The peripheral circuits contain a controller 60 which applies threshold signals to the comparator A1, sends control signals to memory 50 and selects times when the conditional reset circuit R1 becomes active.

The peripheral circuits may also contain a readout circuit RO which reads the content of the memory 50, determines if the light intensity for a given pixel has increased, decreased, or remains unchanged, and sends the output (computed from the current memory value) to a processor.

Generally, an OFF-event is a discrete decrease in light intensity for a given pixel. On the other hand, an ON-event is a discrete increase in light intensity for a given pixel.

In more detail, the comparator tells if light has increased/decreased. For Off event: if Vdiff is lower than the threshold Voff (on Vb), the comparator output is high, and this level is stored in the memory. This means a decrease is detected. If Vdiff is not lower than the threshold, the comparator output is low: no decrease detected.

The only difficulty is that for ON event, a low comparator output means an increase, while high means no change; but for OFF event high comparator output means decrease while low means no change.

So the readout must know the memory content and which threshold was applied. Or, as in the preferred embodiment, there is an inverter for On so that the memory polarity is the same for both on and off.

In one preferred embodiment of the pixel circuit 100 of the present invention, each pixel circuit 100 contains one comparator only, which sequentially acts first as comparator for ON-events, then as comparator for OFF-events (or vice-versa).

The pixel circuit 100 and controller 60 operate as follows.

A change in light intensity received by the photosensor PD will translate to a change in photoreceptor signal Vpr. When the reset circuit R1 is not conducting, the changes in Vpr will be reflected also in the voltage Vdiff at a comparator node at the inverting input (−) to the comparator A1. This occurs because the voltage across the memory capacitor C1 stays constant.

At times selected by the controller 60, the comparator A1 compares the voltage at the comparator node at the second terminal of the memory capacitor C1 (Vdiff) to a threshold voltage Vb (from controller) applied to the non-inverting input (+) of the comparator A1.

The controller 60 operates the memory 50 to store the comparator output Vcomp. The memory 50 is typically implemented as part of the pixel circuit 100 as shown. In other embodiments, however, the memory 50 is implemented as part of column logic circuit (peripheral circuit, one per each column of the pixel array).

If the state of the stored comparator output held in the memory 50 indicates a change in light intensity AND the global reset signal GlobalReset signal from the controller 60 is active, the conditional reset circuit R1 is conducting. Here "AND" indicates the logical AND operator. With the conditional reset circuit R1 in a conductive state, the voltage at the comparator node at the inverting input of the comparator A1 (Vdiff) is reset to a known level. Thus, it stores the current photoreceptor signal Vpr on the memory capacitor C1.

Figure 11:
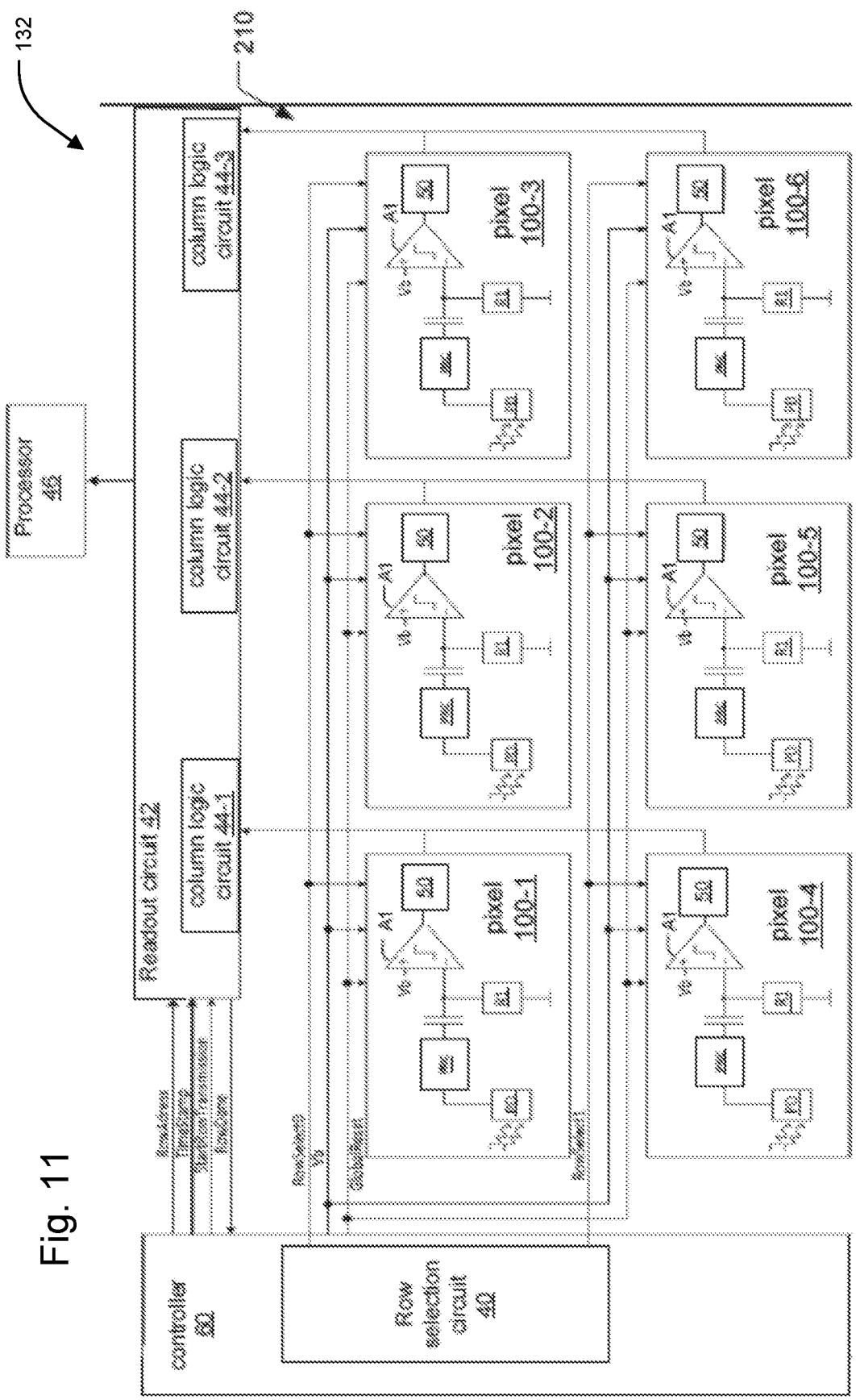
FIG. 11 is a schematic diagram showing the layout of the event-based vision sensor with pixels arranged in a two-dimensional event pixel array of rows and columns.

FIG. 11 shows an exemplary event-based vision sensor 132 comprising a two-dimensional array of pixels 100-1 through 100-6. The illustrated sensor shows only two rows and only three columns to avoid cluttering the figure. In practice the sensor 8 would comprise of m rows (typically much greater than 2) and n columns (typically much greater than 3) of pixels. A pixel in a two dimensional array can be identified by its address which is the pixel's row number and column number. E.g., pixel 100-6 has row 2 (counting from top) and column 3 (counting from left) as its address.

The controller 60 controls pixels 100 and the other components such as the row selection circuit 40, the readout circuit 42, and transmission of data from the array to the processor 46.

In the illustrated example, the row selection circuit 40 is shown as part of the controller 60. This row selection circuit 40 selects one or multiple subsets of rows. When a row of pixels 100 is selected, the comparator outputs of the pixels in the selected row are conveyed to the readout circuit 42.

The readout circuit 42 reads the data (the memorized comparator outputs) from the pixel array. Often the readout circuit 42 will further encode this data into a more efficient representation before transmitting to some kind of receiver (usually a form of processor) which can be external to the sensor chip, such as processor 46.

The readout circuit 42, divided into several column logic circuits 44-1 through 44-$n$, where there are n columns, determines from reading comparator outputs if the light intensity for the corresponding pixel has increased, decreased or remained unchanged.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for maintaining an environmental model of a computing device, comprising
    monitoring an environment with one or more event-based vision sensors of the computing device in which the event-based vision sensors each comprises a two dimensional array of pixels in which each of the pixels of the event-based vision sensors includes a comparator that compares a difference between a photoreceptor signal and a past photoreceptor signal to an OFF-event threshold to determine OFF-events, which are discrete decreases in light intensity, and an ON-event threshold to determine ON-events, which are discrete increases in light intensity for the pixels;
    acquiring motion information from an accelerometer and/or gyroscope of an inertial measurement unit;
    based on the monitoring for the ON-events and OFF-events by the event-based vision sensor and the accelerometer and/or gyroscope, determining whether to adapt a control scheme of a depth sensor assembly and/or a camera of the computing device to acquire depth information and/or image information of the environment; and
    updating the environmental model maintained by the computing device based on the depth information from the depth sensor assembly and/or image information from the camera.

2. The method of claim 1, further comprising:
    acquiring motion information from camera of the computing device; and
    based on the motion information, determining whether to adapt a control scheme, such as activate, the depth sensor assembly to acquire the depth information of the environment.

3. The method of claim 1, further comprising determining whether to activate the depth sensor assembly using the environmental model to predict event occurrences.

4. The method of claim 1, further comprising determining whether to activate the depth sensor assembly using a predicted optical flow of the environmental model.

5. The method of claim 1, further using an estimated pose of the device to determine whether to update the environmental model.

6. The method of claim 1, further comprising only updating the environmental model if events detected by the event-based vision sensor were not predicted by the environmental model.

7. The method of claim 1, wherein each of the pixels further includes a memory that stores an output from the comparator.

8. The method of claim 7, wherein each of the pixels further includes a conditional reset circuit for resetting the capacitor based on the output stored in the memory and a reset signal applied by a controller.

9. The method of claim 1, wherein the computing device is a mobile computing device.

10. The method of claim 1, wherein the motion information is acquired from both an accelerometer and a gyroscope.

11. The method of claim 1, wherein the motion information includes rotational velocities.

12. The method of claim 1, wherein acquiring the motion information further includes acquiring orientation within a gravitational field.

13. A computing device, comprising:
    one or more event-based vision sensors for monitoring an environment in which the event-based vision sensors each comprises a two dimensional array of pixels in which each of the pixels of the event-based vision sensors includes a comparator that compares a difference between a photoreceptor signal and a past photoreceptor signal to an OFF-event threshold to determine OFF-events, which are discrete decreases in light intensity, and an ON-event threshold to determine ON-events, which are discrete increases in light intensity for the pixels;
    a camera for producing image information of the environment;
    a depth sensor assembly for monitoring the environment;
    an inertial measurement unit including an accelerometer and/or gyroscope for generating or acquiring motion information; and
    a processor assembly monitoring for the ON-events and OFF-events by the event-based vision sensor, the camera, and the depth sensor assembly and determining whether to adapt a control scheme of the depth sensor assembly to acquire depth information and/or the camera to acquire image information of the environment based on the ON-events and OFF-events of the event-based vision sensor and the accelerometer and/or gyroscope.

14. The device of claim 13, wherein the processor assembly determines whether to adapt a control scheme, such as activate, the depth sensor assembly using an environmental model to predict event occurrences.

15. The device of claim 13, wherein the processor assembly determines whether to adapt a control scheme, such as activate, the depth sensor assembly using a predicted optical flow of the environmental model.

16. The device of claim 13, wherein the processor assembly uses an estimated pose of the device to determine whether to update the environmental model.

17. The device of claim 13, wherein the processor assembly only updates the environmental model if events detected by the event-based vision sensor were not predicted by the environmental model.

18. The device of claim 13, wherein each of the pixels further includes a memory that stores an output from the comparator.

19. The device of claim 18, wherein each of the pixels further includes a conditional reset circuit for resetting the capacitor based on the output stored in the memory and a reset signal applied by a controller.

20. The device of claim 13, wherein the computing device is a mobile computing device.

21. A method for maintaining an environmental model of a computing device, comprising
    monitoring an environment with one or more event-based vision sensors of the computing device, wherein the event-based vision sensor detects OFF-events as discrete decreases in light intensity and/or ON-events as discrete increases in light intensity for pixels of the event-based vision sensor and includes comparators that compare a difference between a photoreceptor signal and a past photoreceptor signal to a threshold to determine the OFF-events and/or ON-events;
    acquiring motion information from an accelerometer and/or gyroscope of an inertial measurement unit;
    based on the monitoring by the event-based vision sensor and the motion information from the accelerometer and/or gyroscope, determining whether to adapt a control scheme of a depth sensor assembly and/or a camera of the computing device to acquire depth information and/or image information of the environment; and
    updating the environmental model maintained by the computing device based on the depth information from the depth sensor assembly and/or image information from the camera if events detected by the event-based vision sensor were not predicted by the environmental model.

22. The method of claim 21, further comprising only updating the environmental model if events detected by the event-based vision sensor were not predicted by the environmental model.

* * * * *